(12) United States Patent
Chen

(10) Patent No.: US 7,896,490 B1
(45) Date of Patent: Mar. 1, 2011

(54) EYEGLASS STRUCTURE WITH ADJUSTABLE TEMPLE MEMBER

(76) Inventor: Chun-Nan Chen, Tainan (TW)

(*) Notice: Subject to any disclaimer, the term of this patent is extended or adjusted under 35 U.S.C. 154(b) by 0 days.

(21) Appl. No.: 12/618,767

(22) Filed: Nov. 15, 2009

(51) Int. Cl.
 *G02C 5/14* (2006.01)
(52) U.S. Cl. .................... 351/120; 351/119; 351/156
(58) Field of Classification Search ............. 351/120, 351/118, 119, 111, 110, 156, 157, 158, 41
 See application file for complete search history.

(56) References Cited

U.S. PATENT DOCUMENTS 7,300,150 B1 * 11/2007 Chen et al. ................. 351/120
7,396,125 B1 *  7/2008 Tang ........................... 351/120
2006/0221299 A1 * 10/2006 Wang-Lee ................. 351/120

* cited by examiner

*Primary Examiner*—Hung X Dang
(74) *Attorney, Agent, or Firm*—Alan Kamrath; Kamrath & Associates PA

(57) ABSTRACT

The eyeglass structure contains a frame, two hinge members, and two temple members. A chamber is configured in front of each temple member for joining with a hinge member. Each hinge member has a pivot section at one end for pin-joining to the frame and a connector section at the other end. The connector section has saw teeth along a back edge and a locking piece along an inner side. Each temple member has a front opening for receiving the connector section and a side opening for engaging the locking piece when the connector section is threaded into the chamber. Inside each chamber, there are saw teeth to engage the saw teeth of a hinge member so that each temple member could be individually tilted upward or downward.

3 Claims, 5 Drawing Sheets

EYEGLASS STRUCTURE WITH ADJUSTABLE TEMPLE MEMBER

TECHNICAL FIELD OF THE INVENTION

The present invention generally relates to eyeglasses or spectacles and, more particularly, relates to an eyeglass structure whose temple members could be adjusted to vary their angles with the frame.

DESCRIPTION OF THE PRIOR ART

Conventionally, an eyeglass' temple members are pin-joined to the frame and therefore could be laterally folded for carriage and unfolded for wearing. The angle between the temple members and the frame is usually fixed, and a user has to resort to nose pads or twisting the temple members to adjust the eyeglass' wearing position. If not careful, the twisting of the temple members could deform or damage the eyeglass. This is obviously not a practical design.

In addition to the non-adjustable angle between the temple members and the frame, the temple members are usually designed to fit the application style of the eyeglass. If the eyeglass is to be used for a different purpose (such as for exercise, industrial usage, etc.), usually a separate eyeglass is required. This not only requires extra expense but also adds to the trouble of carnage.

SUMMARY OF THE INVENTION

The present invention teaches a novel eyeglass structure mainly containing a frame, two hinge members, and two temple members. A chamber is configured in front of each temple member for joining with a hinge member. Each hinge member has a pivot section at one end for pin-joining to the frame and a connector section at the other end. The connector section has saw teeth along a back edge and a locking piece along an inner side. The locking piece is elastic and could retreat into a through opening of the connector section when compressed. Correspondingly, each temple member's chamber has a front opening for receiving the connector section and a side opening for engaging the locking piece when the connector section is threaded into the chamber during assembly of the hinge and temple members. To disassemble, the locking piece is pressed so that it breaks out of the confinement of the side opening of the temple member. Inside the chamber of each temple member, there are saw teeth to engage the saw teeth of a hinge member so that each temple member could be individually tiled upward or downward in a stepwise manner for various angles.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
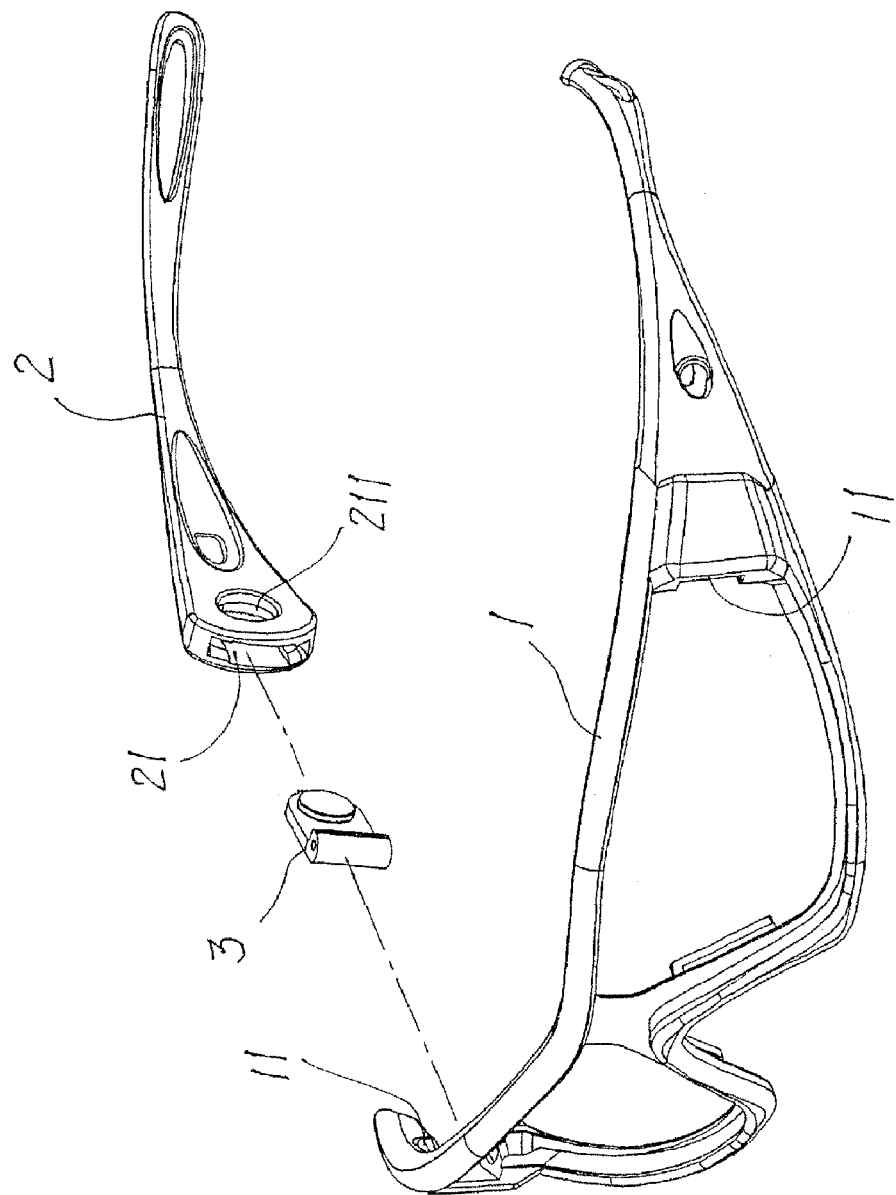
FIG. 1 is a perspective break-down diagram showing major components of an eyeglass structure according to a first embodiment of the present invention.

As shown in FIG. 1, an eyeglass structure according to a first embodiment of the present invention mainly contains a frame 1, temple members 2, and hinge members 3. At each of the left and right end of the frame 1, a positioning slot 11 is provided. Each positioning slot 11 houses and joins with a hinge member 3 so that the hinge member 3 could pivot laterally. On the other hand, each temple member 2 has a chamber at a front end. The chamber has a vertical front opening 21 and a circular side opening 211 on an inner side of the front end of the temple member 2.

Figure 2:
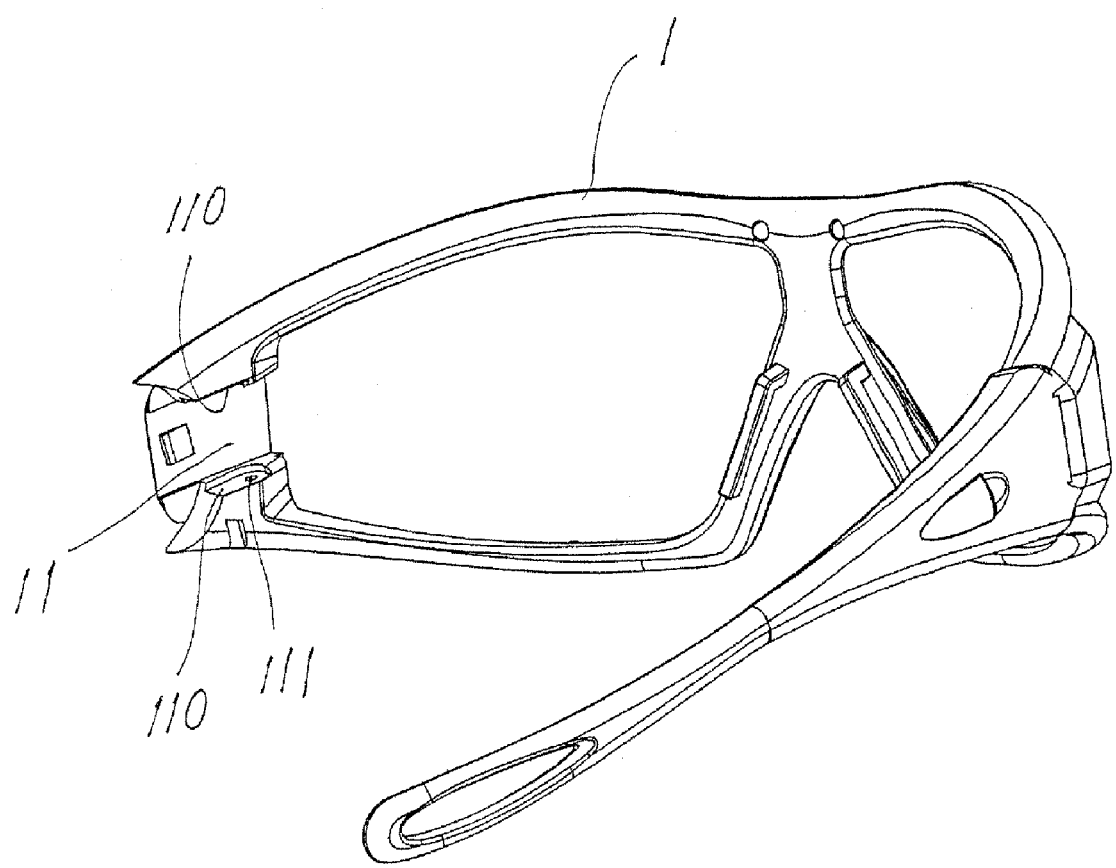
FIG. 2 is a perspective diagram showing a positioning slot of the eyeglass structure's frame of FIG. 1 after a temple member is removed.

As shown in FIG. 2 where a temple member 2 is removed to reveal a positioning slot 11, the positioning slot 11 has upper and lower walls 110, each configured with a pin hole 111.

Figure 3:
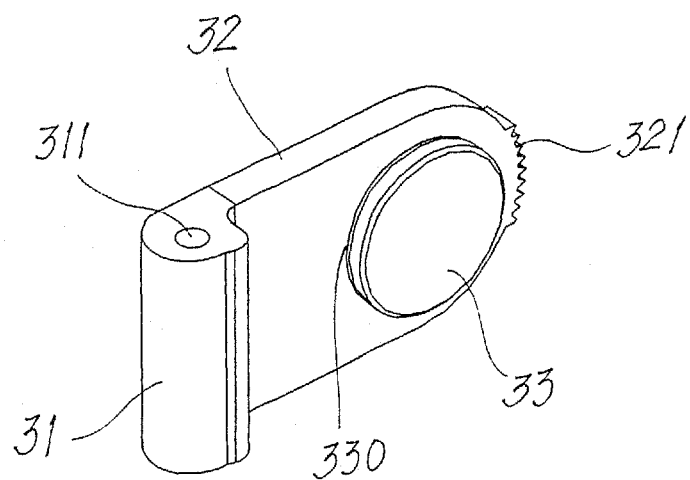
FIG. 3 is a perspective diagram showing a hinge member of the eyeglass structure of FIG. 1.

As further shown in FIG. 3, each hinge member 3 contains a pivot section 31 with a vertical through channel 311. When a hinge member 3 is positioned in a positioning slot 11, the pin holes 111 are aligned with the through channel 311 so that the hinge member 3 and the frame 1 can be rotatably joined together by a pin (not shown). The hinge member 3 further contains a connector section 32 with saw teeth 321 configured along a back edge of the connector section 32 opposite to the pivot section 31. Along an inner side of the connector section 32, a through opening 320 (see FIG. 6) is provided which is substantially covered by a locking piece 33. The locking piece 33 is partially connected to the connector section 32 at an end, bulges away from the through opening 320 and maintains a gap 330 from the through opening 320. When the locking piece 33 is compressed, it moves through the gap 330 and retreats into the through opening 320.

Figure 4:
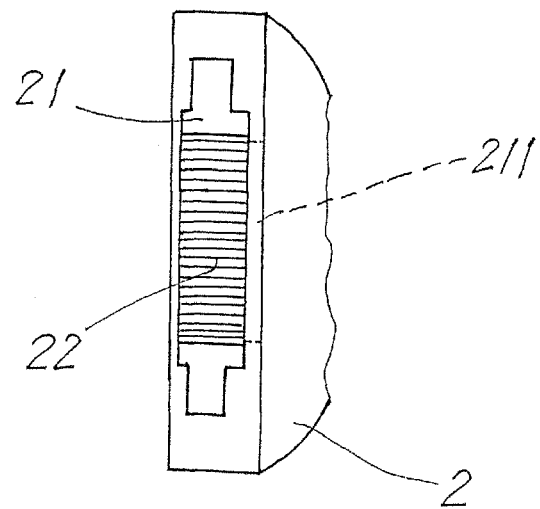
FIG. 4 is a perspective diagram showing a front end of a temple member of the eyeglass structure of FIG. 1, exposing the interior of a chamber of the temple member.

As shown in FIGS. 1 and 4, within the chamber of each temple member 2, saw teeth 22 are provided along an inner wall of the chamber opposite to the front opening 21. The connector section 32 of a hinge member 3 is threaded into the chamber via the front opening 21. The saw teeth 321 of the hinge member 3 engages the saw teeth 22 inside the chamber of the temple member 2, and the hinge member 3 thereby can be tilted around the hinge member 3 vertically.

Figure 5:
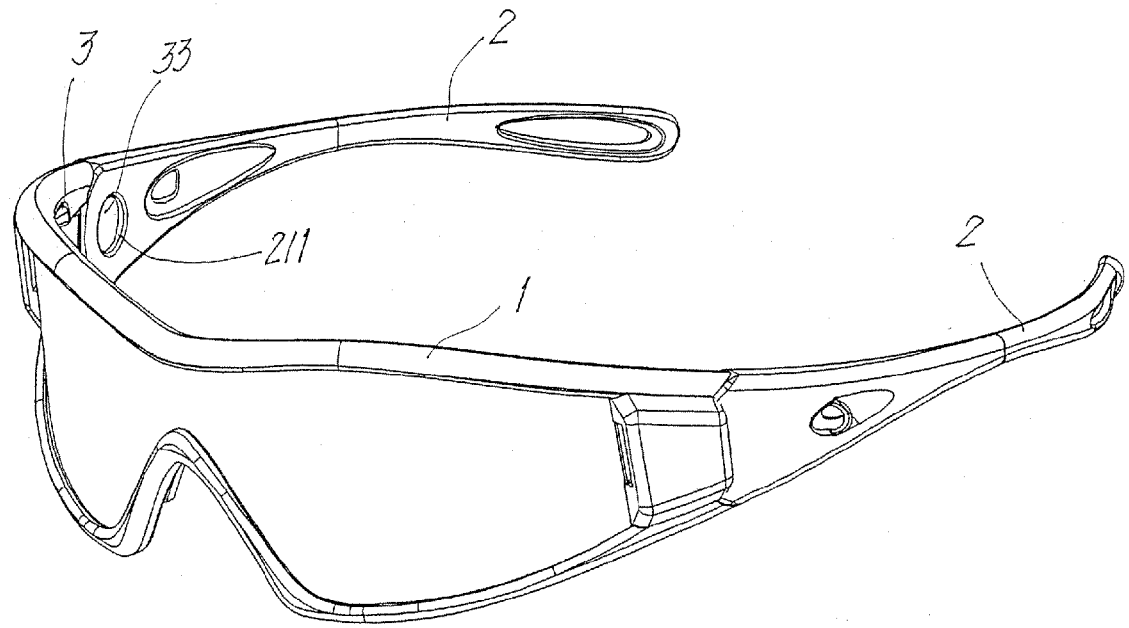
FIG. 5 is a perspective diagram showing the eyeglass structure of FIG. 1 after its assembly.

To assemble the eyeglass structure as shown in FIGS. 1 and 5, each hinge member 3 is pin-joined to a positioning slot 11. The connector section 32 of each hinge member 3 is then threaded through the front opening 21 of a chamber of the temple member 2. In the process, the locking piece 33 is compressed, and, due to its elasticity, it retreats into the through opening 320. As such, the connector section 32 could be completely embedded into the chamber of the temple member 2. As the locking piece 33 is positioned behind the side opening 211, the locking piece 33 bulges into the side opening 211 so that the temple member 2 is reliably joined to the hinge member 3 as illustrated in FIG. 5.

Figure 6:
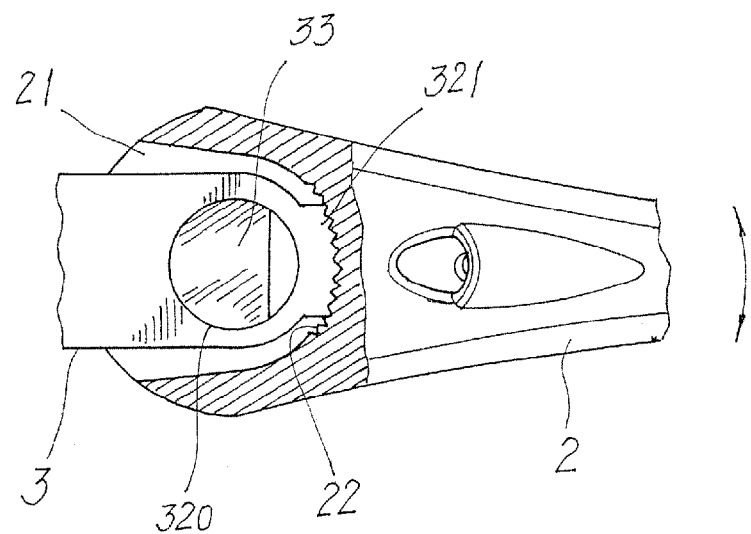
FIG. 6 is a schematic diagram showing the interlocking between a hinge member and a temple member of the eyeglass structure of FIG. 1.

In the mean time, as further shown in FIG. 6, the saw teeth 321 of the hinge member 3 and the saw teeth 22 of the chamber interlock of the temple member 2 with each other, allowing the temple member 2 to tilt in a stepwise manner upward or downward. Please note that, as described, any user could easily and conveniently vary the included angle between a temple member 2 and the frame 1.

Figure 7:
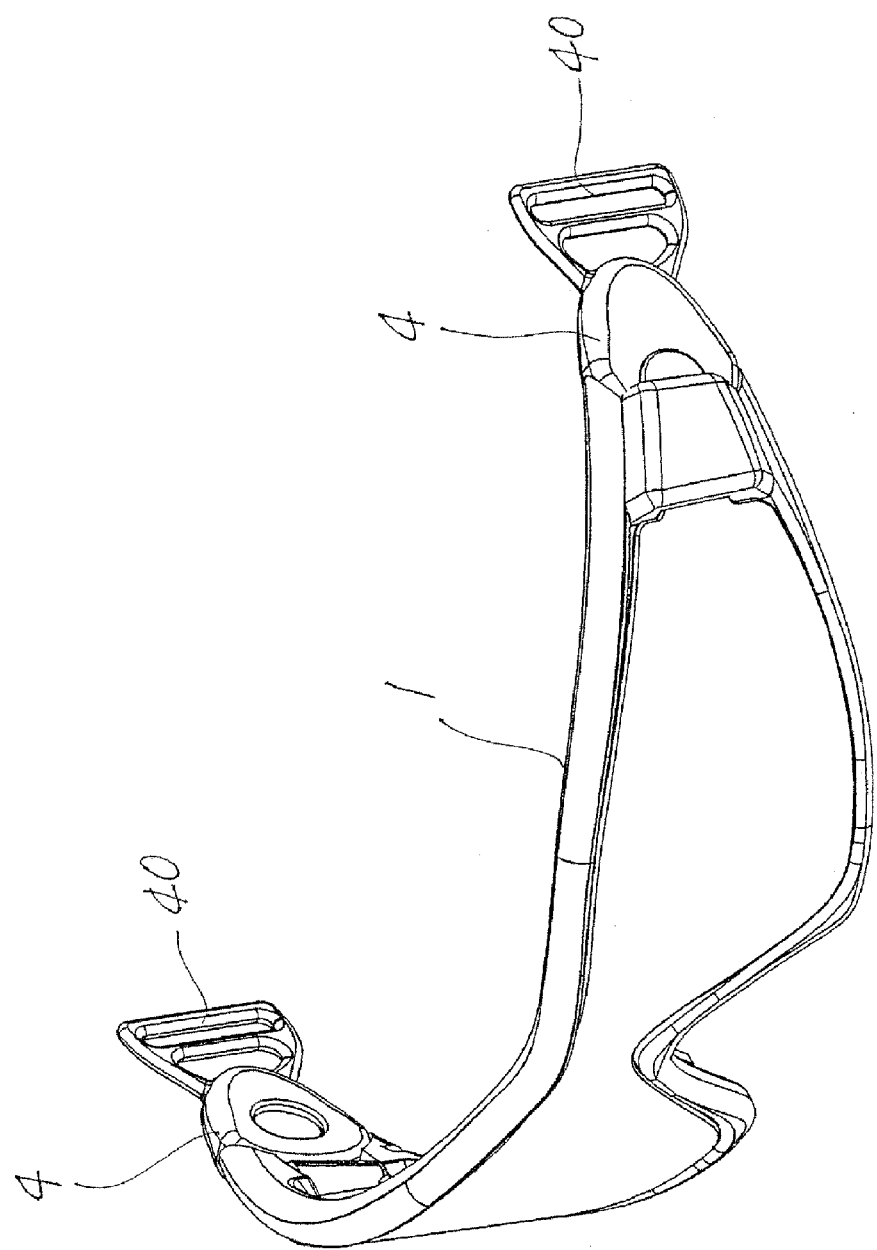
FIG. 7 is a perspective diagram showing an eyeglass structure according to a second embodiment of the present invention.

As shown in FIG. 7, a second embodiment of the present invention provides identical frame 1 and hinge members 3. However, in the present embodiment, each temple member 4 does not have an elongated leg but has a buckle 40. The connection and interaction between the frame 1 and the hinge members 3 and between the hinge members 3 and the temple members 4 are identical to the first embodiment. Yet, with the present embodiment, an elastic band or belt (not shown) could be joined to the buckles 40, and the eyeglass would be ideal for wearing during exercise.

The gist of the present invention lies in that, through the saw teeth interaction, the temple members can be individually adjusted upward and downward for various angles. Additionally, different types of temple members could be easily and conveniently assembled and disassembled with the hinge members. In other words, a user could choose the most appropriate temple members for his/her activities and/or preferences. There is no need to purchase several pairs of eyeglasses.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An eyeglass structure comprising:
   a frame whose left and right ends each have a positioning slot, respectively;
   two hinge members, each positioned in and pin-joined to the respective positioning slot and capable of lateral rotation, wherein each hinge member has a connector section at one end; said connector section has a through opening and a locking piece substantially covering said through opening, with the locking piece being partially joined to said connector section, with a gap maintained between and locking piece and said through opening when the locking piece is in a locking position and with the locking piece compressible into the through opening in a compressed position; and
   two temple members, each having a chamber at a front end for detachably receiving the hinge member, wherein each chamber has a side opening on an inner side; wherein the locking piece is received in the side opening in the locking position and is located outside the side opening in the collapsed position; wherein first saw teeth are provided along a back edge of each hinge member; second saw teeth are provided along a back wall inside each chamber; and said first and second saw teeth engage with each other when the hinge member is extended into the chamber of the temple member, allowing said temple member to tilt upward or downward around said hinge member.

2. The eyeglass structure according to claim 1, wherein each hinge member has a pivot section at one end with a vertical through channel for pin-joining to the positioning slot.

3. The eyeglass structure according to claim 1, wherein each temple member has a buckle for attaching an elastic band.

* * * * *